United States Patent [19]

Norton

[11] Patent Number: 4,999,542
[45] Date of Patent: Mar. 12, 1991

[54] DATA PROCESSING DISPLAY TERMINAL

[75] Inventor: Daniel J. Norton, Hudson, N.H.

[73] Assignee: Harris Data Communications, Inc., Dallas, Tex.

[21] Appl. No.: 421,193

[22] Filed: Dec. 3, 1973

[51] Int. Cl.$^5$ ............................ H01J 1/52; H01J 5/02
[52] U.S. Cl. .................................................... 315/85
[58] Field of Search ........................... 315/13 CG, 85; 174/35 TS, 35 GC, 35 C; 250/551; 307/311; 178/7.82; 317/18 B; 340/255

[56] References Cited

U.S. PATENT DOCUMENTS

| | | | |
|---|---|---|---|
| 2,729,759 | 1/1956 | Kratz et al. | 315/85 |
| 2,882,494 | 4/1959 | Webster | 340/255 |
| 2,886,741 | 5/1959 | Kongable | 315/29 |
| 3,201,653 | 8/1965 | Nuss | 174/35 TS |
| 3,497,616 | 2/1970 | McCown | 250/551 |
| 3,720,781 | 3/1973 | West | 315/85 |

OTHER PUBLICATIONS

The Radio Amateur's Handbook, 50th Ed., American Radio Relay League, 1973, p. 493–497, TK6550.R162.

*Primary Examiner*—Theodore M. Blum
*Attorney, Agent, or Firm*—Tarolli, Sundheim & Covell

[57] ABSTRACT

A data processing display terminal utilizing a cathode ray tube (CRT) display is provided in which information-bearing electro-magnetic radiations are suppressed at the neck of the cathode ray tube and in the video circuits leading thereto, instead of mounting the entire display terminal in a shielded enclosure utilizing a piece of shielded glass over the CRT viewing area. A cylindrical shield is provided which completely encloses the socket and neck of the cathode ray tube, and extends to the proximity of the yoke of the CRT. A plurality of connectors are spaced about the cylindrical shield in the vicinity of the socket to accommodate connections to the socket. The video circuitry which carries the information desired to be displayed is completely shielded. The connectors in the cylindrical shield, with the exception of the video signal connector, are all provided with filters, and the video signal is coupled to the cylindrical shield connector by a shielded coaxial cable.

17 Claims, 3 Drawing Sheets

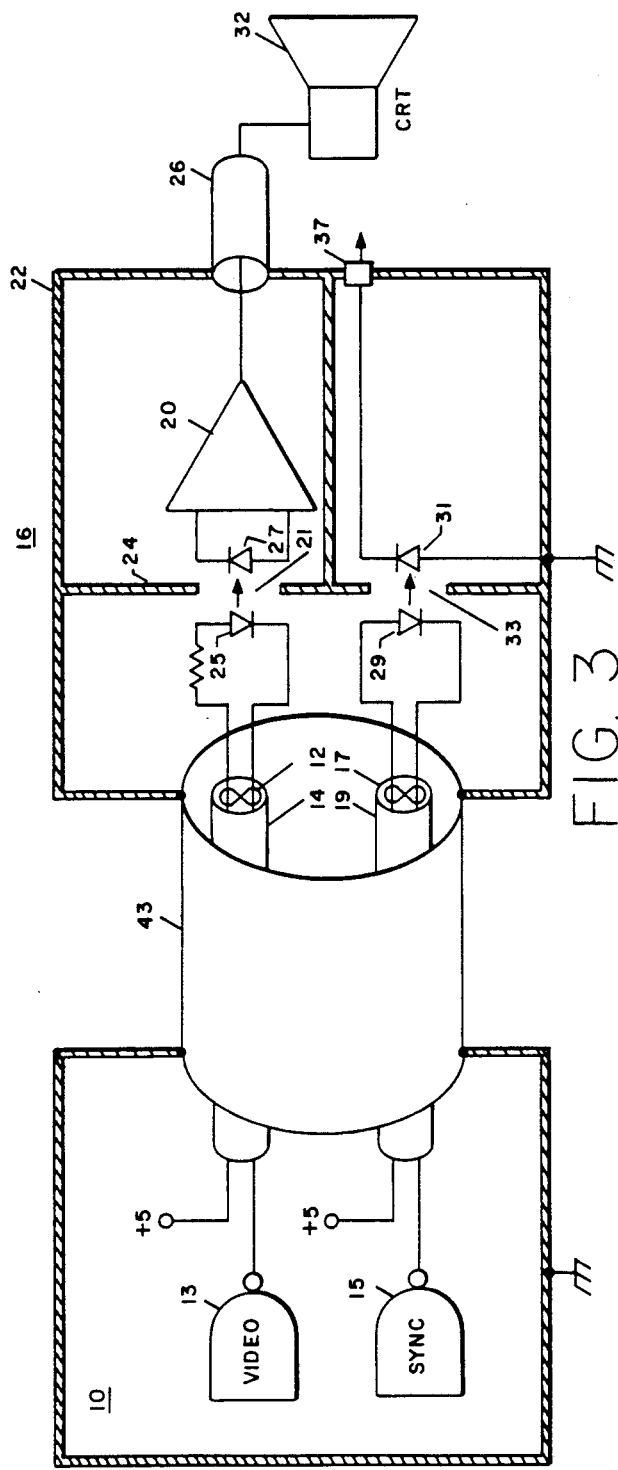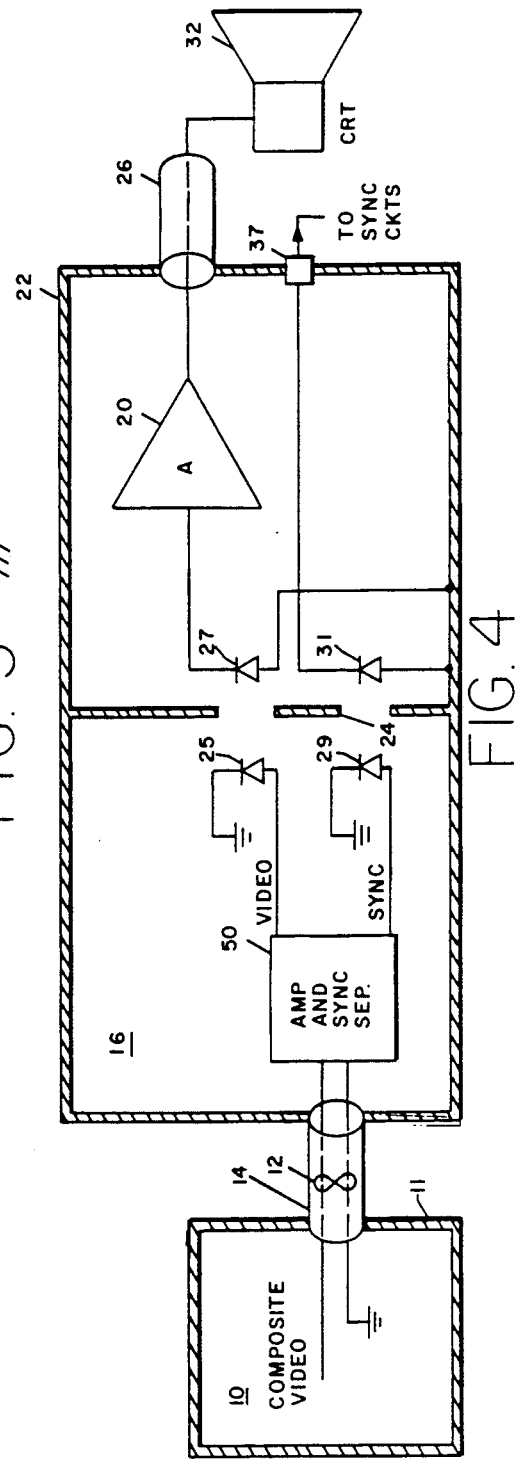

DATA PROCESSING DISPLAY TERMINAL

BACKGROUND OF THE INVENTION

This invention relates to a secure data processing terminal, and more particularly to such a terminal utilizing a cathode ray tube (CRT) display in which information-bearing electromagnetic radiation is suppressed.

Almost all electronic equipment emits various amounts of electromagnetic energy by radiation of electric and magnetic fields and by conduction along power leads and signal lines. This type of self-generated electromagnetic radiation in undesirable, as it interferes with the functioning of the equipment as well as other equipments which are close proximity thereto In the case of communications and data processing equipment, the information being processed can be extracted from self-generated undesirable radiation In security applications, and in military applications where the data being processed may be classified, the undesired radiation could compromise the security of the systems. For commercial appications, unscrupulous competitors might find a way to utilize the extraneous radiations from the display terminals to obtain proprietary information.

In the past, the securing of terminals utilizing a CRT display has involved completely enclosing terminal in a shielded container, and using specially plated conductive glass to cover the cathode ray tube display of the terminal. This brute force approach to the problem is not only bulky and expensive, but also restricts the visibility of the display. The use of a piece of shielded glass in front of the CRT viewing area was apparently dictated by the belief that a large amount of radiation was generated directly from the face of CRT. However, the applicant has discovered that this is not the case, and that a secure terminal can be provided without the necessity of a shielded glass over the face of the tube, and without the necessity of enclosing the entire display unit within the confines of a shield. It has been discovered that the principal sources of unwanted radiation occur at the socket and neck of the CRT and in the video circuits leading thereto.

Accordingly, it is an object of this invention to provide a new and improved data processing terminal having a cathode ray tube display in which unwanted radiation containing the information being processed by the terminal is suppressed.

Another object of this invention is to provide a new and improved radiation-free data processing terminal utilizing a cathode ray tube display which eliminates the need for totally encasing the entire data processing terminal in a shielded enclosure utilizing a piece of shielded glass in front of the CRT viewing area of the terminal.

A further object of this invention is to provide a secure data-processing terminal which suppresses unwanted radiation with a simple, straight-forward approach readily adaptable to existing terminals.

SUMMARY OF THE INVENTION

In carrying out this invention in one illustrative embodiment thereof, a radiation-free data processing terminal utilizing a cathode ray tube display is provided with a cylindrical shield completely enclosing the socket and neck portion of the cathode ray tube which extends to the proximity of the yoke on the neck of the tube. A plurality of connectors are spaced about the cylindrical shield to accomodate the leads for the socket of the cathode ray tube, one which is a shielded connector for supplying the video information to the cathode ray tube which is to be displayed thereon. The video circuits are shielded,

BRIEF DESCRIPTION OF THE DRAWINGS

FIG. 3 is a schematic diagram of another embodiment of the optical isolator circuitary which may be utilized in accordance with the present invention.

FIG. 4 is a schematic diagram of yet another arrangement of the video circuitry.

DESCRIPTION OF THE PREFERRED EMBODIMENTS

Figure 1:
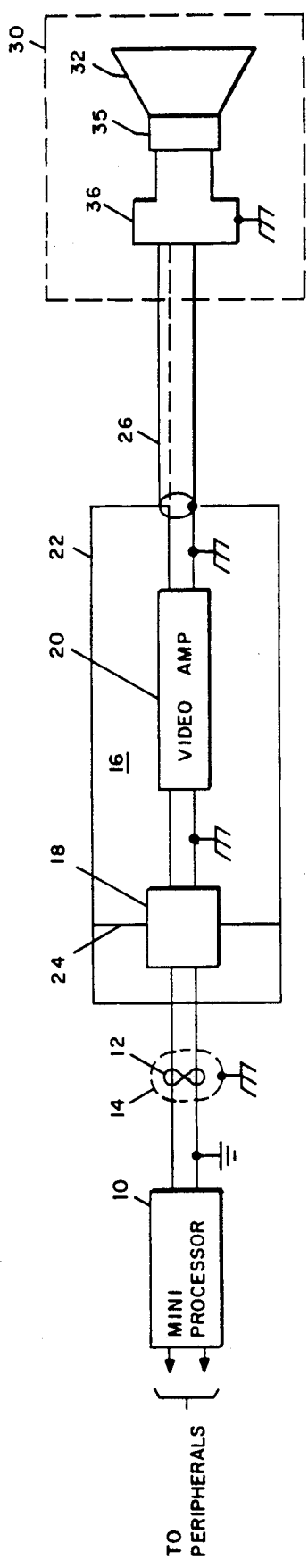
FIG. 1 is a block schematic diagram of a portion of a data processing display terminal illustrating certain aspects of the present invention.

In the drawings, structure grounds are designated by a horizontal line with a plurality of parallel slanting lines underneath, while the signal ground is designated by a series of parallel horizontal lines of decreasing size.

Referring now to FIG. 1, a portion of a data processing terminal is shown schematically, which includes a miniprocessor 10 and a display section 30. The miniprocessor 10 may include a keyboard and connections to such peripheral equipment as card readers, and the like. The illustrated terminal is known as a Sanders 804, but is should be understood that the principles of this invention may be utilized with other types of data processing display terminals. The miniprocessor 10 has the signal ground isolated from the structure or chasis ground. The particular display section 30 illustrated however, which includes the cathode ray tube 32 and the deflection circuits power supply, etc., (not shown), has a common signal and structural ground. Accordingly, if the entire display section 30 is not totally enclosed and shielded, the chasis thereof may act as an effective radiating antenna for all the information-bearing energy within the miniprocessor 10 unless other precautions are taken. Since, in accordance with the present invention, it is desired to eliminate the total shielding of the display portion 30, it has been found to be important to isolate the logic signal ground from the structural ground of not only the logic enclosure of the miniprocessor but also the chassis of the display portion 30 of the equipment as well. To accomplish this, the electrical path between the two sections must be broken, while still allowing transfer of very high speed video data from the miniprocessor 10 to the display section 30. The video circuitry 16 accomplishes this result.

The video signal from the logic circuitry of the miniprocessor 10, which is the signal that generates the characters on the face of the CRT 32, is transmitted over a twisted pair of wires 12, one of which is the hot side of the video signal, and the other of which is the signal ground. The twisted pair of leads 12 is enclosed in a shield 14 which is connected to structure ground. The twisted pair of leads 12 is coupled to video circuitry 16, which is enclosed in a shielded structure 22 having an internal divider shield 24 therein. The video signal is applied to an optical isolator 18, which is mounted in a small aperture 21 (see FIG. 2) in the shield 24 which extends across the video circuitry 16 chassis. The optical isolator 18 is a commercially available item which will be discussed more fully with respect to FIGS. 2 and 3 and may, for example, be one obtainable from the Hewlett Packard Company as their model No. 5082-4360. The output of the optical isolator 18 is connected to a video amplifier 20 which also includes sychronizing signal separating circuitry. The output of the isolator 18 consists of a hot lead and a ground lead, the latter of which is connected to structure ground, and all the structure grounds of the various components are connected together in the video circuitry 16 because they are mounted on a common metal frame containing the shield 22. The output of the video amplifier 20 is fed over a coaxial line 26 to the cathode ray tube 32 in the display section 30.

Figure 2:
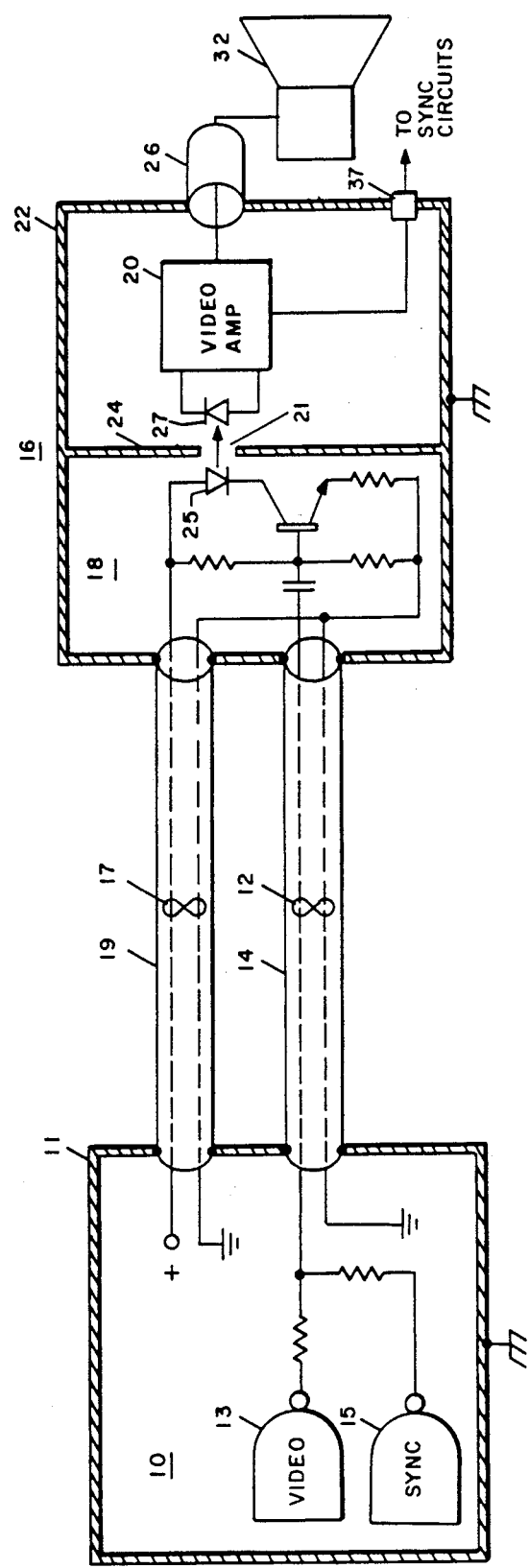
FIG. 2 is a schematic diagram illustrating one form of optical isolator circuitry which may be utilized in the present invention.

FIG. 2 illustrates one form of video circuitry 16 which may be employed in the invention. A video signal gate 13 and a synchronizing signal (sync) gate 15 have their outputs combined to form a composite video signal which is applied from the logic circuitry of miniprocessor 10 and coupled via twisted pair 12 enclosed within shield 14 to the optical isolator circuitry 18. The logic circuitry of the miniprocessor 10 is enclosed by a shield 11 and includes another pair of twisted leads 17 which pass through a shield 19 and are for providing a source of potential and a ground return path for the optical isolator circuitry 18. It will be noted that the signal ground is isolated in the miniprocessor 10 from the structural ground. The optical isolator circuitry 18 includes a transmitting element 25 which generates a light beam the intensity of which is proportional to the apllied signal. Receiving the transmitted light is a photosensitive element 27 which generates 25 and 27 which form the optical isolator are mounted in an aperture 21 of the shield 24. The type of elements utilized for the optical isolator 18 will depend on the speed and bandwidth requirements of the video circuit. One suitable type of optical isolator which can handle high speeds with bandwidths of greater than 5 MHz may be a light-emitting diode for transmitting element 25 and a pin diode for the receiving photosensitive element 27. The output of the photosensitive element 27 is applied to video amplifier 20 and from there through a coaxial line 26 to the cathode ray tube 32 for controlling the intensity of the beam. The sync signals are also taken off the video amplifier 20, which, in this embodiment, includes sync separating circuitry, and applied through a small low pass filter 37 to the synchronizing circuits of the CRT 32. The filter 37 may, for example, include a bead of ferrite around the conductor, to form an inductance, and a coaxial capacitor. The optical isolator circuit 18 functions to separate the logic signal ground from the CRT display structure ground.

FIG. 3 illustrates another embodiment in which the video signal from the gate 13 and the sync from the gate 15 remain separated and are applied to separate optical isolators. The video signal is applied via twisted pair of leads 12 which are shielded by the shield 14 to the transmitting element 25 which cooperates with receiving photosensitive element 27 to pass the video signal on to the video amplifier 20. The sync signal is applied from the gate 15 over the twisted lead pair 17, shielded at 19, to a transmitting element 29 cooperating with a receiving element 31, which are mounted in the aperture 33 of the shield 24. The sync signals are passed through the small filter 37 to the sync circuits of the display section 30. The twisted pairs of leads 12 and 17 are also encased in an external shield 43 (which external shield also may also be utilized in the embodiment of FIG. 2). The advantage of the circuit of FIG. 3 is that it provides a fully balanced video isolator due to the fact that all signal and return currents are carried on a single twisted pair, thereby providing an optimum cancellation of external fields, with less radiation. The disadvantage, of course, is that a separate optical isolator must be provided for the sync signals. However, fewer parts are required in the circuit of FIG. 3, because in the case of FIG. 2 the amplifier must be able to handle the three level composite video signal while the video amplifier of FIG. 3 is only required to handle the bilevel output of the video gate 13. The sync signal optical isolator 29, 31 of FIG. 3 may also be a low-speed optical isolator, which would thereby act as a low-pass filter, reducing the chance that video might be coupled to the unshielded CRT sync sweep circuitry.

FIG. 4 illustrates an arrangement which is preferred in those cases in which the miniprocessor provides only a composite video signal, rather than separate synchronizing and video components. The composite signal is led by means of the twisted pair of leads 12 enclosed in the shield 14 from the miniprocessor 10 to the video circuitry 16. More particularly, the signal applied to an amplifier and synchronizing signal separator 50 from which separate video and synchronizing signals are obtained. The remainder of the circuit may be similar to that of FIG. 3. The video signal is passed through the optical isolator 25, 27 to the video amplifier 20 and then through the coaxial line 26 to the cathode ray tube. The synchronizing signal is passed through the optical isolator 29, 31 and then through the filter 37 to the synchronizing circuits in the display section 30. The arrangement of FIG. 4 has many of the advantage previously mentioned in connection with FIG. 3, such as that the video amplifier 20 need handle only a bilevel signal and that the isolator 29, 31 may be a low speed isolator.

Figure 5:
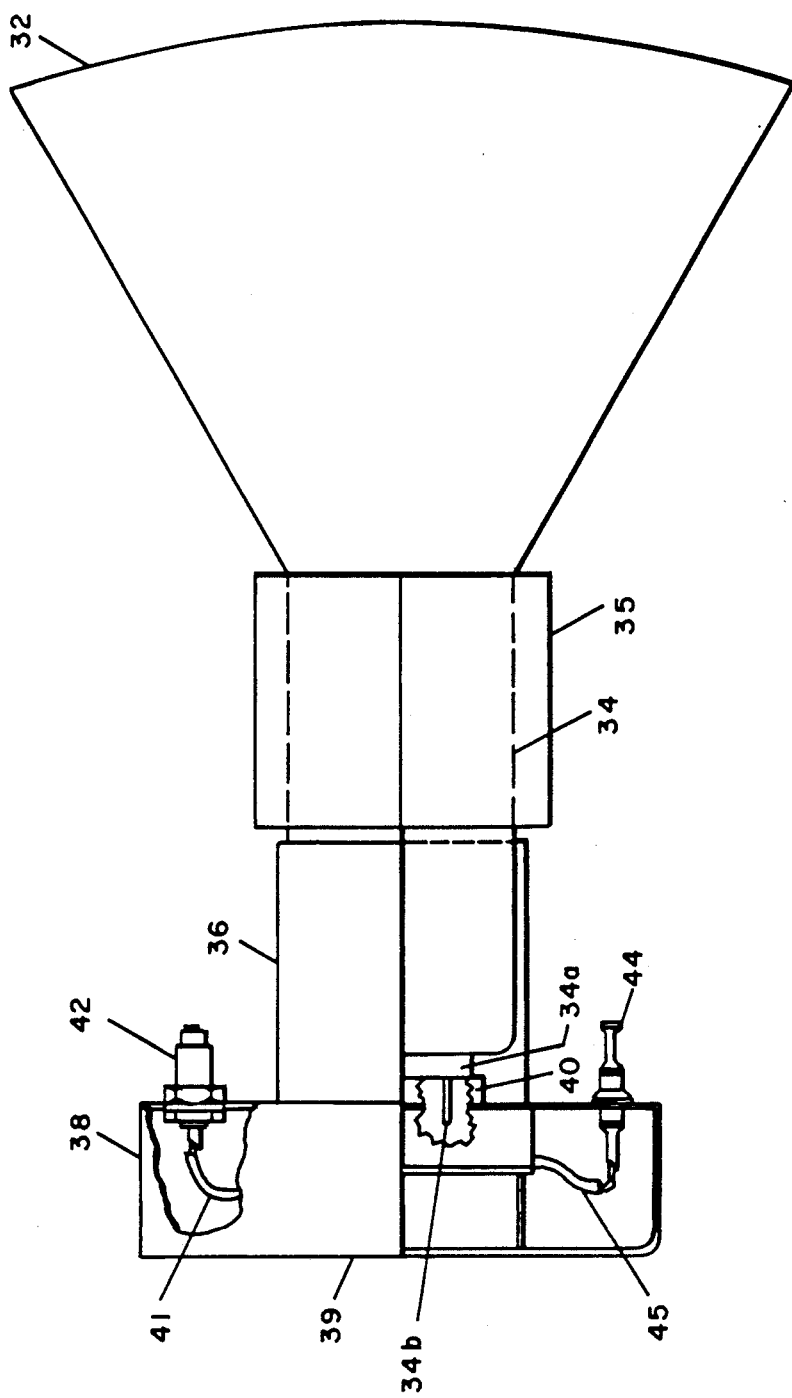
FIG. 5 shows the shielding employed on the neck of a cathode ray tube with parts broken away, which is employed in the present invention.

As has been pointed out previously, it has been found that the principal source of radiation from the cathode ray tube 32 occurs at the neck of the CRT. The structure shown in FIG. 5 is utilized to alleviate this problem. The cathode ray tube 32 includes a neck 34 a base 34a and a plurality of pins such as the pin 34b protruding from the base to provide electrical connections between the interior electrodes of the tube 32 and external circuits. A deflection yoke assembly 35 is mounted on the neck 34. A connector socket 40 is mounted on and makes connections to the pins 34b. A cylindrical shield 36 having an enlarged cylindrical end portion 38 thereon encirles the socket and the neck 34 of the CRT 32, with the shield 36 extending as far as, or in proximity to, the yoke assembly 35. The enlarged cylindrical portion 38 of the shield 36 accomodates a plurality of connectors 44, only one of which is shown, around the outside to accomodate various non-video leads for the tube 32. Each connector 44 is preferably a feed through filter similar to the filter 37. The shield 36 is terminated by a cover 39 which may be soft-soldered to the shield enlarged portion 38 after assembly. Video lead 41 from the tube socket 40 is soldered to the connector 42. Lead 45 is connected to the connector 44. The connector 42 may be in the form of a bulkhead jack to which the coaxial cable 26 may be attached. All the other leads pass through the shield by means of connectors 44, which, as noted above, are feed-through filters. Accordingly, all leads which pass through the shield 36 are provided with a filter with the exception of connector 42 to which the video signal is coupled to the cathode ray tube 32. The shield 36 is constructed with a cylindrical portion which makes a press fit around the neck 34 of the tube 32.

By shielding the neck of the cathode ray tube, and providing filters in all leads thereto other than the video signal lead, isolating the signal and structure grounds using the optical isolator, and completely shielding the video circuitry structure including the optical isolator and video amplifier, a secure display terminal is provided. All shields are made of suitable shielding materials, e.g. metal. This approach eliminates the need for awkward and bulky shielding which requires the enclosure of the complete display section 30 utilizing shielded glass to cover the viewing area of the CRT 32. Since the present invention does not employ such a shielded glass, the visibility of the CRT display is unimpaired. The approach utilized by the present invention is versatile and may be utilized in any data processing terminal employing a CRT display with Z axis modulation for many computer and communication applications. The flexibility of the display portion of the terminal is not impaired by awkward and bulky shielding, thus providing greater flexibility in terminal package arrangements.

Since other modifications and changes, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What is claimed is:

1. A data processing display terminal utilizing a cathode ray tube display in which information-bearing electromagnetic radiations are suppressed, comprising, in combination,
   (a) a cathode ray tube including a neck, a base and a plurality of connector pins protruding from said base,
   (b) a conductive shield surrounding and completely enclosing said pins, said base and said neck except for an opening through which said neck protrudes,
   (c) a plurality of connectors including one coaxial connector mounted on said shield to accomodate electrical connections to said pins, each of said connectors with the exception of said coaxial connector including filtering means, and
   (d) a video circuit coupled to said coaxial connector on said shield for supplying video information to said cathode ray tube to be displayed thereon.

2. A data processing display terminal in accordance with claim 1, which includes a yoke mounted on said neck of said tube and in which said shield extends around and engages said neck substantially as far as said yoke.

3. A data processing display terminal in accordance with claim 1 in which said electrical connections include a socket mounted on said pins and leads interconnecting said socket and said connectors.

4. A data processing display terminal set forth in claim 3 wherein said shield includes an enlarged conductive cylindrical portion surrounding said socket on which said connectors are mounted and a conductive cover for said enlarged cylindrical portion, 5. A data processing display terminal set forth in claim 1 including a conductive shielded structure for completely enclosing and shielding said video circuit.

6. A data processing display terminal set forth in claim 5 wherein said video circuit includes a video amplifier and an optical isolator coupled to said video amplifier, 7. A data processing display terminal set forth in claim 6 including an internal conductive divider shield which contains an aperture therethrough and which is mounted within said shielded structure, said optical isolator being positioned in said aperture.

8. A data processing display terminal as set forth in claim 1 in which said conductive shield includes a cylindrical portion encircling and engaging said neck adjacent to said opening.

9. A data processing display terminal utilizing a cathode ray tube display in which information-bearing electromagnetic radiations are suppressed, comprising
   (a) logic circuitry for generating a video signal containing information which is to be displayed, said logic circuitry having different signal and structure grounds,
   (b) a display section including a cathode ray tube, said section having common signal and structure ground, and
   (c) video circuitry coupled between said logic circuitry and said display section for isolating the video signal ground of said logic circuitry from said common ground of said display section, thereby preventing the ground of said display section from acting as a radiating antenna for said video signal.

10. A data processing display terminal set forth in claim 9 including a conductive shielded structure completely enclosing said video circuitry.

11. A data processing dispaly terminal as set forth in claim 10 including a conductive internal divider shield mounted to divide the space enclosed by said shielded structure into two parts in which said video circuitry includes an optical isolator positioned in a small aperture formed in said divider shield.

12. A data processing display terminal as set forth in claim 9 wherein said cathode ray tube includes a base and a neck and which includes a generally cylindrical, conductive shield mounted to completely enclose said base and the portion of said neck adjacent thereto.

13. A data processing display terminal set forth in claim 12 wherein said cylindrical shield has mounted thereon a plurality of connectors for accommodating connections to said cathode ray tube.

14. A data processing display terminal set forth in claim 13 wherein one of said plurality of connectors has said video signal coupled thereto and the remainder of said connectors each contains a filtering means.

15. A data processing display terminal set forth in claim 9 wherein said video circuitry comprises an optical isolator and a video amplifier, said optical isolator having a light-transmitting element coupled to said logic circuitry for generating a light beam having an intensity proportional to the applied video signal, a photosensitive element generating a signal proportional to the intensity of the light falling thereon from said transmitting element, and means for coupling the output of said photosensitive element to said video amplifier.

16. A data processing display terminal set forth in claim 9 wherein said logic circuitry generates a video signal and a synchronizing signal, said video circuitry comprising a first optical isolator to which said video signal is applied, a video amplifier in said video circuitry coupled to said first optical isolator means, and a second optical isolator to which said synchronizing signal is applied.

17. A data processing display terminal in accordance with claim 10 in which said logic circuitry generates a composite video signal and in which said video circuitry includes an amplifier and synchronizing signal separator for obtaining separate video and synchronizing signals and which includes first and second optical isolators to which said video and synchronizing signals respectively are applied.

* * * * *